June 21, 1927.
L. S. HARBER
1,633,014
PAN FILLING MACHINE
Filed July 8, 1924
2 Sheets-Sheet 1
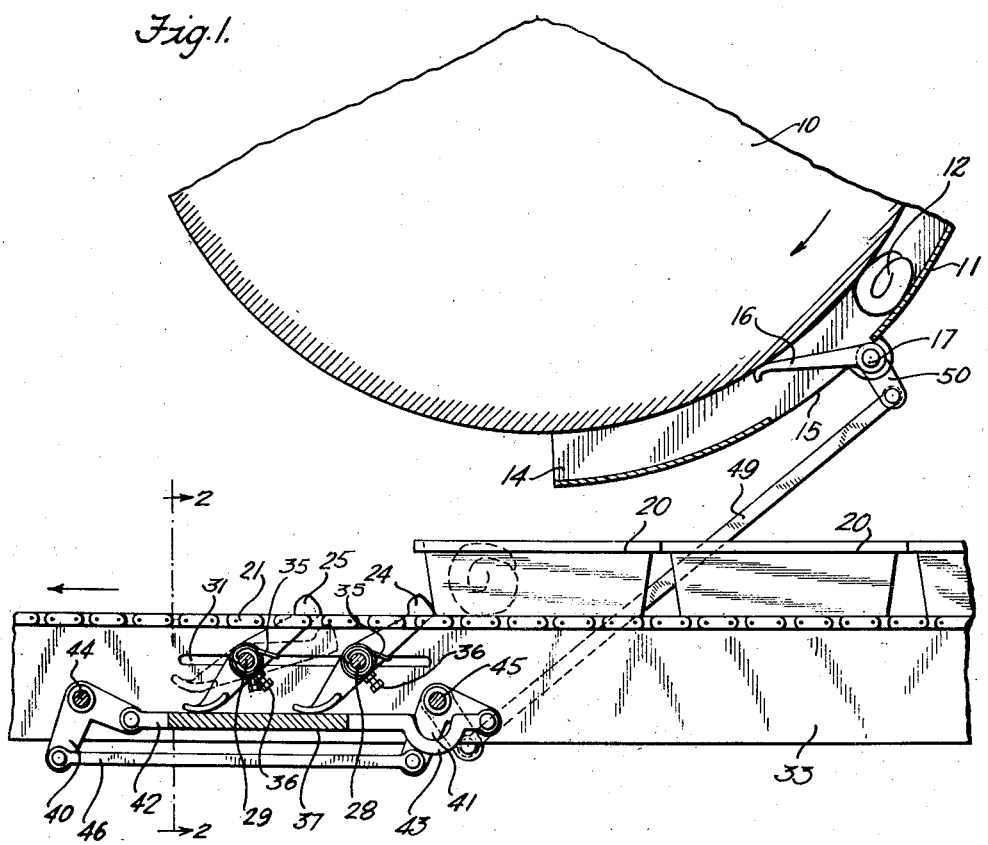
Fig. 1.
Fig. 2.
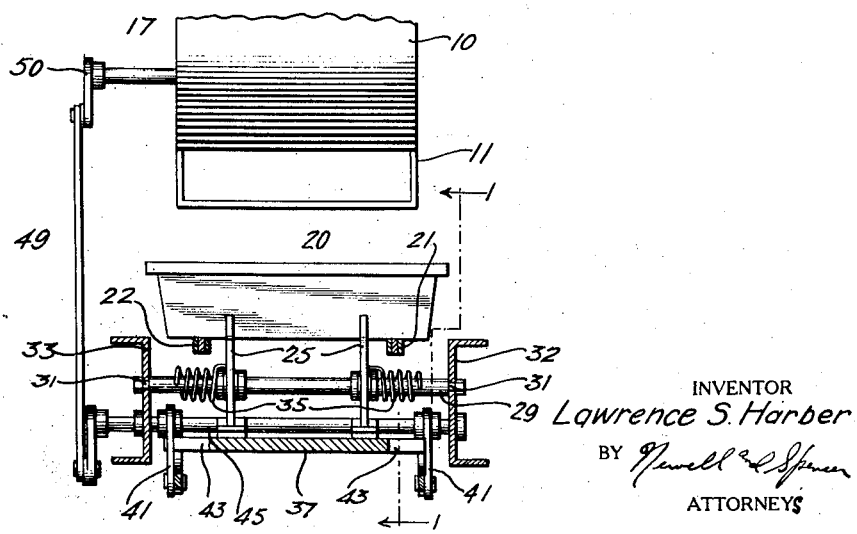
INVENTOR
Lawrence S. Harber
BY
ATTORNEYS June 21, 1927.

L. S. HARBER 1,633,014

PAN FILLING MACHINE

Filed July 8, 1924

INVENTOR
Lawrence S. Harber
BY Newell & L Spencer
ATTORNEYS

Patented June 21, 1927.

1,633,014

UNITED STATES PATENT OFFICE.

LAURENCE S. HARBER, OF SAGINAW, MICHIGAN, ASSIGNOR, BY MESNE ASSIGNMENTS, TO BAKER PERKINS COMPANY, INC., OF SAGINAW, MICHIGAN, A CORPORATION OF NEW YORK.

PAN-FILLING MACHINE.

Application filed July 8, 1924. Serial No. 724,755.

This invention relates to baking machinery and more particularly to machines for placing loaves in baking pans or similar receptacles.

In baking bread or other materials on a commercial scale, it has been the practice heretofore to place the loaves in the pans by hand. This hand operation takes relatively a considerable amount of labor and time and therefore adds materially to the expense of the baking operation. The manipulation of the loaves by hand also is liable to result in unsanitary conditions and should be avoided. The principal object of the present invention is to provide a machine by which loaves may be successively deposited in baking pans automatically. With this object in view, certain features of the invention relate to a machine embodying means by which this broad result is secured.

Certain pans employed in commercial baking are arranged to hold two or more loaves, while other pans are designed to hold a single loaf only. Another feature of the present invention consists in the provision of a machine which may be so adjusted that it will deposit one loaf or two or more loaves in each pan, as desired.

The invention is adapted for use with all sorts of baking receptacles, and is by no means limited to the particular type of receptacles commonly known as pans. For the sake of convenience, however, the word "pan" is used in this application to designate the receptacles for the material to be baked, and it should be understood that the term is not used in a restricted sense but includes any type of receptacle suitable for employment in connection with the invention. Likewise the term "loaf," as used herein, is intended to indicate any mass of material to be baked.

The invention will be clearly understood by a reference to the accompanying drawings which illustrate the preferred form of the invention.

In the drawings

Fig. 1 is a view partly in side elevation and partly in vertical section of a mechanism embodying the invention;

Fig. 2 is a view partly in end elevation and partly in vertical section of this mechanism, along the lines 2—2 in Fig. 1;

Figure 3:
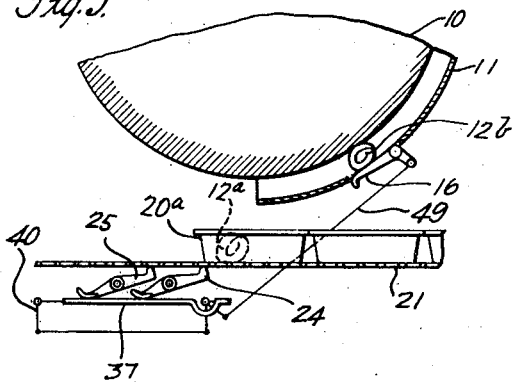
Figs. 3, 4, 5 and 6 illustrate somewhat diagrammatically the operation of the machine when used to fill pans adapted to contain two loaves.
Figure 4:
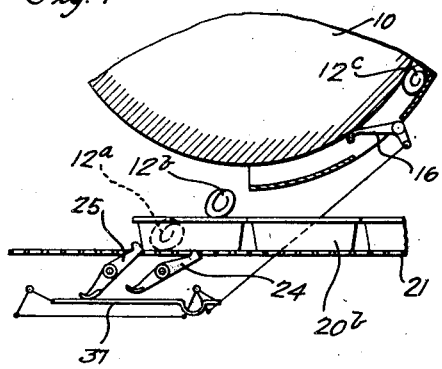
Figure 5:
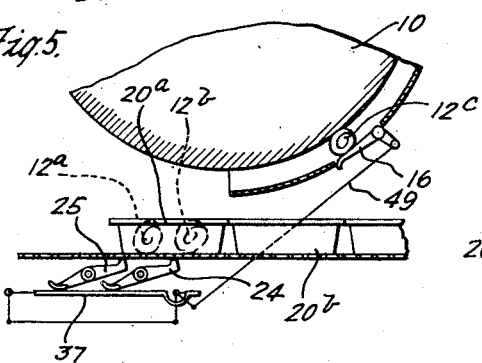
Figure 6:
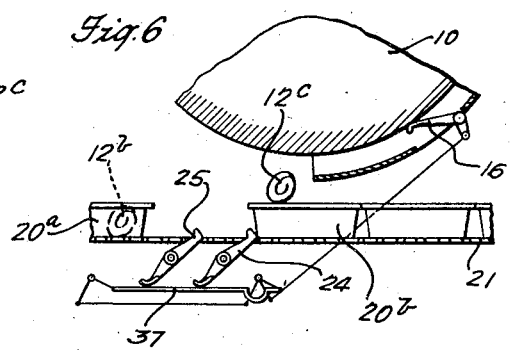

The accompanying drawings illustrate the invention as embodied in mechanism employed in connection with a dough rolling machine, in which sections of dough are rolled into loaves between a roller and a stationary trough. The invention is by no means limited to use with a dough rolling machine, however, but may be used with any sort of loaf depositing mechanism.

The invention comprises the provision of means whereby pans carried under the discharge opening of a dough rolling machine may be held temporarily in position for a loaf to be deposited at a particular point therein.

The holding means may comprise pawls or other members normally projecting into the path of the pans so as to keep a pan in the proper position under the discharge opening until a loaf is deposited in the pan, whereupon automatic means, controlled preferably by the movement of the succeeding loaf in the dough rolling machine, will operate to release the holding means and permit the pan to be carried forward. The dough rolling machine may be of any well-known type and, as illustrated in the drawings, comprises a roller 10 partially surrounded by a stationary trough 11. In this type of machine a sheet of dough is coiled into a cylinder and is rolled through the trough to complete the formation of a loaf by the action of the cylinder 10, the loaf being discharged from the trough through the discharge opening 14. Suitable means are provided in the trough whereby the movement of the loaf 12 will cause the release of the pan holding means. In the drawings, this means comprises a plate 16 which is inserted in an opening 15 in the trough and normally extends across the trough. The plate 16 is shown as mounted upon a rotatable shaft 17, so that it may be pushed downwardly by the loaf so as to permit the passage of the same and to operate the pawl releasing mechanism, which will be described below.

The pans 20, to be filled, are moved beneath the discharge opening 14 by any suitable means, such as a continuously moving pan carrier comprising in the illustrated embodiment a pair of chains 21 and 22, passing about suitable sprocket wheels and driven by mechanism not shown. The machine is provided with one or more stops or holding members projecting above the pan carrier into the path of the pans to hold each pan stationary under the discharge opening of the trough 11 while a loaf is deposited therein. The pans may be adapted to hold only a single loaf, or, in accordance with common practice in baking, may be large enough to hold two or more loaves. In the first case, a single stop member or a plurality of members operating to stop the pans at a single point may be used, and in the latter case stop members may be spaced along the path of travel of the pans so as to stop and hold the pans in various positions under the discharge opening 14 to allow any desired number of loaves to be deposited therein and to space these loaves in any desired manner. In Figures 1 to 6, inclusive, of the drawings, the pans 20 shown are of sufficient size to hold two loaves and two sets of stop members are provided, consisting in the embodiment shown of a pair of pawls 24 positioned to hold a pan with its forward portion under the discharge opening 14, and a second pair of pawls 25 positioned to hold a pan with its rear portion under the discharge opening. Pawls 24 and 25 are rotatably mounted upon shafts 28 and 29, which extend between a pair of rails 32 and 33 and are preferably set in slots 31 therein, in such a manner that the shafts with their pawls may be shifted along the path of travel of the pans so as to allow the spacing of the loaves in the pans to be varied as desired. The shafts 28 and 29 are shown affixed to the rails 32 and 33 by means of nuts 34. In order to maintain the tops of pawls 24 and 25 normally in the path of travel of the pans 20, springs 35 affixed to the shafts and bearing against the pawls are provided, these springs tending to elevate the acting ends of the pawls. In order that each of the pawls may be locked in inoperative position on the shaft on which it is mounted, each pawl is provided with a set screw 36 threaded into the central part of the pawl and arranged to engage the shaft. The dotted lines in Fig. 1, for example, indicate the positions of the pawls 25 when locked out of operation.

Suitable mechanism is provided for connecting the loaf controlled plate 16 with the stop pawls in such a manner that, when the stop members are located in the path of the pans, the loaf controlled plate will be across the trough 11, and that when this plate is pushed downwardly by the passage of a loaf, the pawls will be actuated to release the pan held stationary beneath the discharge end of the trough 11 by one of the pawls, and allow this pan to move forward. In the particular embodiment of the invention illustrated, the lower portions of the pawls are provided with curved surfaces which rest upon an actuating plate 37, and when this plate is raised, the pawls will be swung about shafts 28 and 29 so as to move their upper ends below the path of movement of the pans. The actuating plate 37 is connected with the plate 16 by mechanism which causes said plate 37 to be raised and lowered in response to the movements of plate 16. In the construction shown, the plate 37 is attached at both sides by means of extensions 42 and 43, respectively, to the mutually corresponding ends of two pairs of bell crank levers 40 and 41, which are respectively mounted on shafts 44 and 45 which are rotatably set in rails 32 and 33. The bell crank levers 41 are connected with the bell crank levers 40, respectively, by means of links 46, so as to insure synchronous movement of these levers. The bell crank levers are connected with the plate 16 by mechanism comprising an arm 46 on shaft 45, an arm 50 affixed to shaft 17, and a link 49 connecting said arms.

By means of this arrangement, when the plate 16 is moved downwardly by a loaf 12, the bell crank levers will be moved to raise plate 37, which action will cause the pawls 24 and 25 to be swung against the tension of springs 35 so that their upper ends will be moved downwardly out of the path of the pans. When the loaf 12 has passed over plate 16 toward discharge opening 14, the weight of plate 37 will move the bell crank levers so as to operate arms 48 and 50 and link 49 in a manner to move the plate 16 back to the position shown in Fig. 1, and the tension of the springs 35 will tend to swing the pawls in a direction to lift the upper ends of the pawls, and unless a portion of one of the pans 20 is above both pairs or one pair of pawls, the pawls will be moved back to the position shown in Fig. 1 so as to again project in the path of the pans.

The operation of the mechanism shown in Figs. 1 and 2, in depositing two loaves in each pan of the type shown, is illustrated by Figs. 3, 4, 5 and 6. Figure 3 illustrates the position of the mechanism after a loaf 12$^a$ has just been deposited in the forward part of a pan 20$^a$ and the plate 16 has just been moved downwardly by the passage of a succeeding loaf 12$^b$ so as to raise plate 37 and to move the pawls 24 and 25 out of the path of the pan 20$^a$, and thereby release the pan. The speed of the chains 21 and 22 is regulated so that by the time loaf 12$^b$ has been carried beyond plate 16 and the pawls released the pan 20ᵃ will have been carried above pawls 24 but not above pawls 25. As the loaf 12ᵇ is carried beyond plate 16, this plate is forced upwardly by the weight of the plate 37 in the manner described above to locate the plate across the trough 11. The tops of the pawls 24 will then rest against the bottom of pan 20ᵃ, but the pawls 25 will be actuated to locate the upper ends thereof in the path of the pan 20ᵃ to hold it in the position shown in Fig. 4. When held by the pawls in this position, the loaf 12ᵇ as it is ejected from discharge opening 14 will fall into the rear portion of pan 20ᵃ. The succeeding loaf 12ᶜ as it is carried along trough 11 will force the plate 37 upwardly and swing the pawls 25 into the position shown in Fig. 5. The chains 21 and 22 will then carry pan 20ᵃ above and beyond the pawls. The loaf 12ᶜ will by the preferred method of operation be carried beyond the plate 16 before the pan 20ᵃ passes beyond the pawls; but as soon as pan 20ᵃ passes beyond pawls 24, the springs 35 acting on the pawls 24 will swing the pawls 24 in a direction to lift the upper ends thereof into the path of a second pan 20ᵇ, and thereby stop the movement of the latter pan. Thus this pan will be held in position to receive in the forward portion thereof the loaf 12ᶜ as it is discharged from the trough 11. The mechanism will then continue to operate automatically in the manner described as long as loaves are carried through the trough 11.

In starting the mechanism in operation, if it it is desired to use the pans to their full capacity, a loaf such as 12ᵃ may be first deposited in the foremost pan by hand, or the foremost pan may be held by hand in position with its front portion under the discharge opening 14 until the loaf is deposited therein by the dough rolling machine. While it is not necessary that the movement of the pans be exactly synchronized with the movement of the moving members of the dough rolling machine, the relative movements of this member and the pan carrying chains should be so timed that they will operated in the above-described manner.

Figure 7:
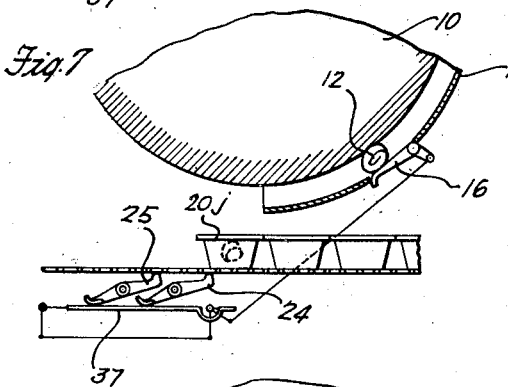
Figs. 7, 8 and 9 illustrate somewhat diagrammatically the operation of this machine when used to fill pans containing a single loaf.
Figure 8:
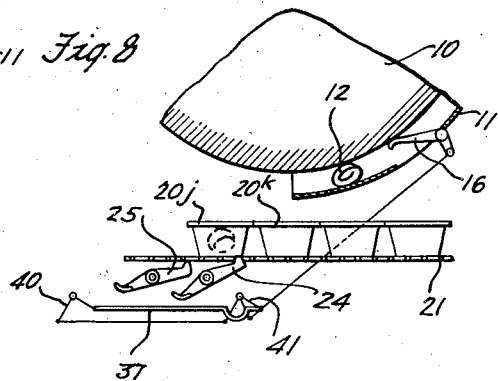
Figure 9:
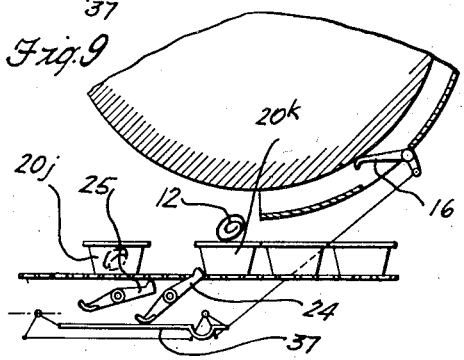

When the machine illustrated in Figs. 1 and 2 is used to fill pans adapted to contain only a single loaf, the pawls 25 are locked in an inoperative position, and the pawls 24 will operate alone. As shown in Figs. 7, 8 and 9, when the mechanism is operating to fill pans holding a single loaf, each pan is held by pawls 24 under the discharge opening of trough 11 until a loaf is deposited therein. When a succeeding loaf 12 passes through the trough, the plate 16 is moved downwardly to raise plate 37 and swings pawls 24 in a direction to depress the upper ends of pawls 24 so as to release a pan 20ʲ which already contains a loaf, and allow the same to pass over and beyond these pawls, (see Fig. 7). As soon as this loaf 12 has passed beyond plate 16, pawls 24 will be swung in a direction to lift the upper ends thereof, the pawls engaging the under side of the pan 20ʲ which has just been released, as shown in Fig. 8. As the pan 20ʲ is carried beyond the pawls 24 by the movement of the chains, the upper ends of the pawls are lifted into position to engage and stop the succeeding pan 20ᵏ. This pan is then held by the pawls until a loaf is discharged therein and the pawls are released by the succeeding loaf. The mechanism will then continue to operate automatically in this manner as long as loaves are passed through the trough 11.

The invention may, of course, be embodied in numerous other types of machines without departing from the spirit and scope thereof.

What I claim as new is:

1. The combination with a loaf depositing mechanism of means for carrying a pan into position to receive a loaf from said mechanism and for holding the same in said position until after a loaf is deposited therein.

2. In a pan filling machine, a loaf depositing mechanism, means for moving a plurality of pans past said mechanism, means for holding each pan stationary in a position to receive a loaf, and means controlled by the next succeeding loaf for releasing said holding means.

3. In a pan filling machine, a loaf depositing mechanism, means for moving pans past said mechanism, means for holding each pan stationary at intervals in positions to allow a plurality of loaves to be successively deposited at different points therein, and means controlled by the loaf succeeding the deposited loaf for releasing said holding means after each depositing operation.

4. In a pan filling machine, a travelling pan carrier, a loaf depositing mechanism, a pawl normally acting as a stop for the pans carried by said carrier to permit loaves to be deposited in said pans, and means controlled by the loaf succeeding the deposited loaf for rendering said pawl temporarily inoperative after each depositing operation.

5. In combination, a loaf depositing mechanism arranged to deposit loaves in succession at a certain point, means for moving a train of pans past said point, means for holding each pan temporarily stationary in one position until after a loaf is deposited therein, and means for thereafter holding said pan temporarily stationary in a second position until after a second loaf is deposited therein.

6. In a pan filling machine, a traveling pan carrier a loaf depositing mechanism, means for holding a pan stationary in a position to receive a loaf during at least a part of the loaf depositing action of said mechanism, and power actuated loaf controlled means for releasing said holding means.

7. In a pan filling machine, a loaf depositing mechanism, means for moving a plurality of pans past said mechanism, means for holding each pan stationary in a position to receive a loaf during at least a part of the loaf depositing action of said mechanism, and power actuated loaf controlled means for releasing said holding means.

8. In a pan filling machine, a travelling pan carrier, a loaf depositing mechanism, means for holding a pan stationary in position to receive a loaf during at least a portion of the loaf depositing action of said mechanism, said carrier being constantly operative on the pan, and means for releasing said holding means after the depositing of a loaf in the pan.

9. In a pan filling machine, a travelling pan carrier, a loaf depositing mechanism, a plurality of pawls for holding a pan carried by said carrier stationary at intervals so as to allow a plurality of loaves to be successively deposited at different points therein, and means operated by the loaf succeeding each deposited loaf for temporarily rendering said pawls inoperative in succession.

10. In a pan filling machine, a loaf depositing mechanism, means for moving a plurality of pans past said mechanism, means for holding each pan stationary in a position to receive a loaf, and power actuated means controlled by the next succeeding loaf for releasing said holding means.

11. In a pan filling machine, a loaf-depositing mechanism, means for moving a pan past said mechanism, means for holding the pan stationary at intervals in positions to allow a plurality of loaves to be deposited successively at different points therein, and loaf controlled means for releasing said holding means after the deposition of each loaf.

12. In a pan filling machine, a traveling pan carrier, a loaf-depositing mechanism, means for holding a pan stationary in a position to receive a loaf during a portion of the loaf-depositing action of said mechanism, and means for releasing said holding means after the deposition of a loaf in the pan.

13. In a pan filling machine, a travelling pan carrier, a loaf depositing mechanism, a plurality of pawls for holding a pan carried by said carrier stationary at intervals so as to allow a plurality of loaves to be successively deposited at different points therein, and power actuated means operated by the loaf succeeding each deposited loaf for temporarily rendering said pawls inoperative in succession.

14. In a pan filling machine, a travelling pan carrier, loaf-depositing mechanism, and means operating in timed relation to said mechanism to hold a pan stationary during a portion of the loaf-depositing action of said mechanism and to release said pan after the deposition of a loaf therein.

15. In a pan filling machine, a traveling pan carrier, a loaf-depositing mechanism, a pawl normally acting as a stop for the pans carried by said carrier, and power actuated loaf controlled means for rendering said pawl temporarily inoperative.

16. In a pan filling machine, a travelling pan carrier, a loaf depositing mechanism, a plurality of pawls for holding a pan carried by said carrier stationary at intervals so as to allow a plurality of loaves to be successively deposited at different points therein, and power actuated loaf controlled means for rendering said pawls temporarily inoperative.

17. In a pan filling machine, a travelling pan carrier, a loaf depositing mechanism, a plurality of pawls engaging a pan carried by said carrier and adapted to hold said pan stationary to permit a plurality of loaves to be successively deposited at different points therein, and loaf controlled means for rendering certain of said pawls inoperative after the deposition of each loaf.

18. In a pan filling machine, a travelling pan carrier, a loaf depositing mechanism, a plurality of sets of pawls normally adapted to engage said pans at different locations along the line of travel on the carrier so as to arrest the pans in such positions as to permit depositing a plurality of loaves successively at different points in each pan, loaf controlled means for rendering one of said pawls temporarily inoperative after the deposition of each loaf, and means whereby one or more of said sets of pawls may be rendered permanently inoperative.

19. In a pan filling machine, a pair of continuously moving chains to carry the pans, a pawl normally projecting between said chains in the path of said pans, and loaf controlled means for temporarily moving said pawl out of said path.

20. In combination, a mechanism for rolling dough into loaves comprising a roller and a trough partially surrounding the roller, means to carry pans beneath the end of said trough, a pair of rails, horizontal slots in said rails, a pair of shafts mounted on said rails in said slots, a pair of pawls rotatably mounted on each of said shafts and normally extending above said carrying means into the path of said pans to act as stops therefor, a set screw in each of said pawls whereby the pawl may be rendered permanently inoperative, a horizontal plate beneath said pawls, a second plate normally extending across said trough and movable by said loaves, and mechanism connecting the two plates and operated by the movement of said second plate to move said horizontal plate upwardly against said pawls to temporarily render the pawls inoperative.

21. In a pan filling machine, a loaf depositing mechanism, means for moving pans past said mechanism, means for holding each pan stationary at intervals in positions to allow a plurality of loaves to be successively deposited at different points therein, and power actuated means controlled by the loaf succeeding the deposited loaf for releasing said holding means after each depositing operation.

22. In a pan filling machine, a travelling pan carrier, a loaf depositing mechanism, a pawl normally acting as a stop for the pans carried by said carrier to permit loaves to be deposited in said pans, and power actuated means controlled by the loaf succeeding the deposited loaf for rendering said pawl temporarily inoperative after each depositing operation.

Signed at Saginaw, Michigan, this 3rd day of July, 1924.

LAURENCE S. HARBER.